United States Patent
Tran et al.

(10) Patent No.: US 11,099,463 B2
(45) Date of Patent: Aug. 24, 2021

(54) TWO-AXIS DIRECT DRIVE MECHANICAL MECHANISM

(71) Applicant: VIETTEL GROUP, Ha Noi (VN)

(72) Inventors: Duy Nhat Tran, Vinh (VN); Tien Hai Tran, Ha Noi (VN); Quang Trung Trinh, Ha Noi (VN); Thanh Luong Nguyen, Ba Don (VN)

(73) Assignee: VIETTEL GROUP, Ha Noi (VN)

( * ) Notice: Subject to any disclaimer, the term of this patent is extended or adjusted under 35 U.S.C. 154(b) by 140 days.

(21) Appl. No.: 16/732,974

(22) Filed: Jan. 2, 2020

(65) Prior Publication Data
US 2020/0218138 A1 Jul. 9, 2020

(30) Foreign Application Priority Data
Jan. 3, 2019 (VN) .............................. 1-2019-00037

(51) Int. Cl.
| | |
|---|---|
| G03B 17/56 | (2021.01) |
| B64C 39/02 | (2006.01) |
| B64D 47/08 | (2006.01) |
| F16M 11/08 | (2006.01) |
| F16M 11/20 | (2006.01) |
| G03B 15/00 | (2021.01) |
| F16M 11/18 | (2006.01) |

(52) U.S. Cl.
CPC .......... *G03B 17/561* (2013.01); *B64C 39/024* (2013.01); *B64D 47/08* (2013.01); *F16M 11/08* (2013.01); *F16M 11/18* (2013.01); *F16M 11/2021* (2013.01); *G03B 15/006* (2013.01); *B64C 2201/027* (2013.01); *B64C 2201/127* (2013.01); *B64D 2221/00* (2013.01)

(58) Field of Classification Search
USPC ........................................................ 396/12
See application file for complete search history.

(56) References Cited

U.S. PATENT DOCUMENTS

| | | | | |
|---|---|---|---|---|
| 5,426,476 | A * | 6/1995 | Fussell ................... | B64D 47/08 348/E5.026 |
| 6,356,308 | B1 * | 3/2002 | Hovanky ........... | G08B 13/1963 348/373 |
| 7,473,040 | B2 * | 1/2009 | Kenoyer ............ | H04N 5/23299 396/428 |
| 2004/0042783 | A1 * | 3/2004 | Diana ................ | F16M 11/2014 396/427 |
| 2014/0327764 | A1 * | 11/2014 | Nelson ................... | F16M 13/02 348/143 |
| 2017/0254469 | A1 * | 9/2017 | Okamura ............... | F16M 11/10 |
| 2017/0261836 | A1 * | 9/2017 | Wada .................... | G03B 17/561 |
| 2018/0099744 | A1 * | 4/2018 | Bockem ............... | G01S 7/4813 |
| 2018/0367738 | A1 * | 12/2018 | Fukuzawa .......... | H04N 5/23299 |
| 2019/0098189 | A1 * | 3/2019 | Kimura ................ | H04N 5/2251 |
| 2019/0163039 | A1 * | 5/2019 | Zhang ................ | H04N 5/23238 |

* cited by examiner

*Primary Examiner* — Rodney E Fuller
(74) *Attorney, Agent, or Firm* — PatentTM.US

(57) ABSTRACT

The invention proposes the two-axis direct drive mechanical mechanism of a multi-sensor observation device for unmanned aerial vehicles. This is a mechanical mechanism to perform rotate pan-tilt axis by direct drive motor. This mechanism include main components: assembly pedestal, assembly pan-axis and assembly tilt-axis. Electronic circuits, encoders, mechanism, motor are optimized arranged and scientifically designed to the layout space and the weight of the structure. This mechanism can integrate optical sensors such as infrared cooling cameras, high resolution camera, laser rangefinder.

7 Claims, 3 Drawing Sheets

TWO-AXIS DIRECT DRIVE MECHANICAL MECHANISM

TECHNICAL FIELD

The invention refers to the rotating Pan-Tilt mechanism, which can be used for stationary, mobile or unmanned aerial vehicle. Specifically, the content mentioned in the invention describes the design of products belonging to the class of two-axle drive devices, composed of mechanical axial movement, axial and mechanical movement, direct drive motor and microcontroller electronic circuit.

BACKGROUND OF THE INVENTION

In the published patent documents, some works have content concerning two-axis drive mechanisms for pan-axis and tilt-axis rotation equipment. However, some shortcomings and limitations of the published inventions remain as follows:

United States Published Patent Application No. 20060071121 A1 "Gimbal system" published Apr. 6, 2006 describes the design of a multi-axis drive mechanism. The content of the invention mainly covers space-saving layout methods. Detail design of the driving mechanism, the industrial design aren't mentioned in the content of the inventor.

U.S. Pat. No. 8,882,369 B1 "integrated gimbal assembly" issued Oct. 11, 2014 describes the design of a two-axis drive mechanism. However, the design uses a gear or belt drive system. This design focus on easily assembly; exact factors, space-saving layout, weight optimization, industrial design aren't mentioned in the content of the invention.

To overcome the above limitations, the authors of the Viettel Aerospace Institute propose a two-axis direct drive mechanism of the multi-sensor observation device used for scanning equipment, communication equipment, observation systems for motor vehicles and unmanned aerial vehicles (UAVs), unlike any other patents ever published.

BRIEF SUMMARY OF THE INVENTION

The purpose of the present invention is to describe in detail the design of the two-axis direct drive mechanism of the multi-sensor observation device. The system uses a direct drive motor and encoder to minimize the transmission error of the mechanism for the two axes and azimuth, integrating electric commutator on both axes to ensure the rotation system functions in 360°*n. Furthermore, the structure optimizes the layout space of microcontroller electronic circuits, electric commutators, direct drive motors and encoders as well as reducing the mass of the direct drive mechanism.

To achieve the above purpose, the authors propose to design a two-axis direct drive mechanism consisting of assembly parts show in FIG. 1: Assembly pedestal (1), Assembly Pan-axis (2) and Assembly Tilt-axis (3). In addition, The detailed parts in each assembly of the two-axis direct drive mechanism are detailed in FIG. 4.

Assembly pedestal (1) consists of: Mounting foot (4), Central processing box (5), Central controller electronic circuit (6), Motor and slip-ring mounting bracket pan-axis (7), Pan-axis Direct motor (8), Mounting stator of Pan-axis Direct motor (9), Mounting rotor of Pan-axis Direct motor (10), Pan-axis shaft (11), Thin Section Bearing (12), Inner spacing part (13), Outer spacing part (14), Inner grommet (15), Outer grommet (16), Fixing inner bearing part (17) and Pan-axis Encoder (18).

Assembly Pan-axis (2) consists of: Pan-axis turntable (19), Pan-axis Electronic circuit board (20), Pan-axis Encoder reader and Mounting (21), Pan-axis support arm (22), Tilt-axis Direct motor (23), Mounting stator of Tilt-axis Direct motor (24), Spacing foot motor (25), Mounting rotor of Tilt-axis Direct motor (26), Tilt-axis shaft (27), Tilt-axis Motor bearing (28), Encoder reader support hand (29), Spacing foot (30), Encoder reader mounting (31), Tilt-axis Mounting slip-ring shaft (32), Tilt-axis bearing (33), Tilt-axis Encoder reader (34).

Assembly Tilt-axis (3) consists of: Electronic image processing block (35), Radiator (36), Encoder shaft mounting (37), Tilt-axis Encoder (38), Tilt-axis rotation shaft (39), Tilt-axis Electronic circuit board (40), Optical sensors brackets (41).

All sensor systems, microprocessor circuit, motor, encoder and auxiliary equipment are firmly fixed and protected by aluminum alloy frames.

The invention's products can be applied in scanning equipment, communications equipment, observation systems for motor vehicles and UAVs.

DETAILED DESCRIPTION OF THE INVENTION

Figure 1:
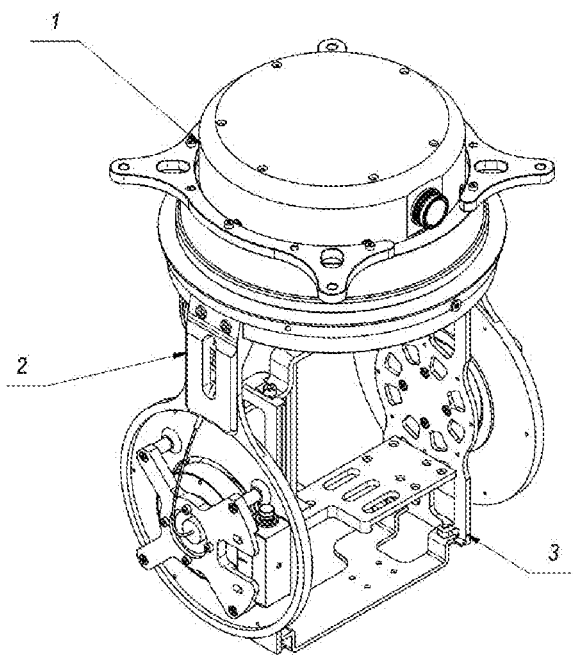
FIG. 1 Overview of the mechanical structure design.
Figure 2:
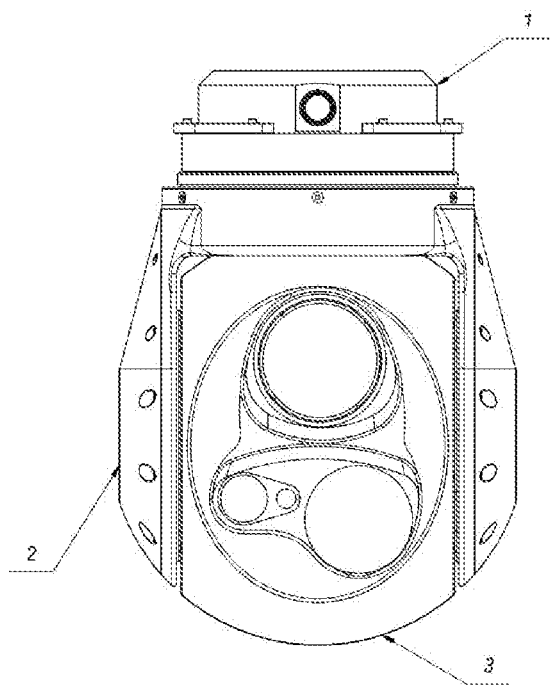
FIG. 2 Industrial design with protective housing and the optical sensors.
Figure 3:
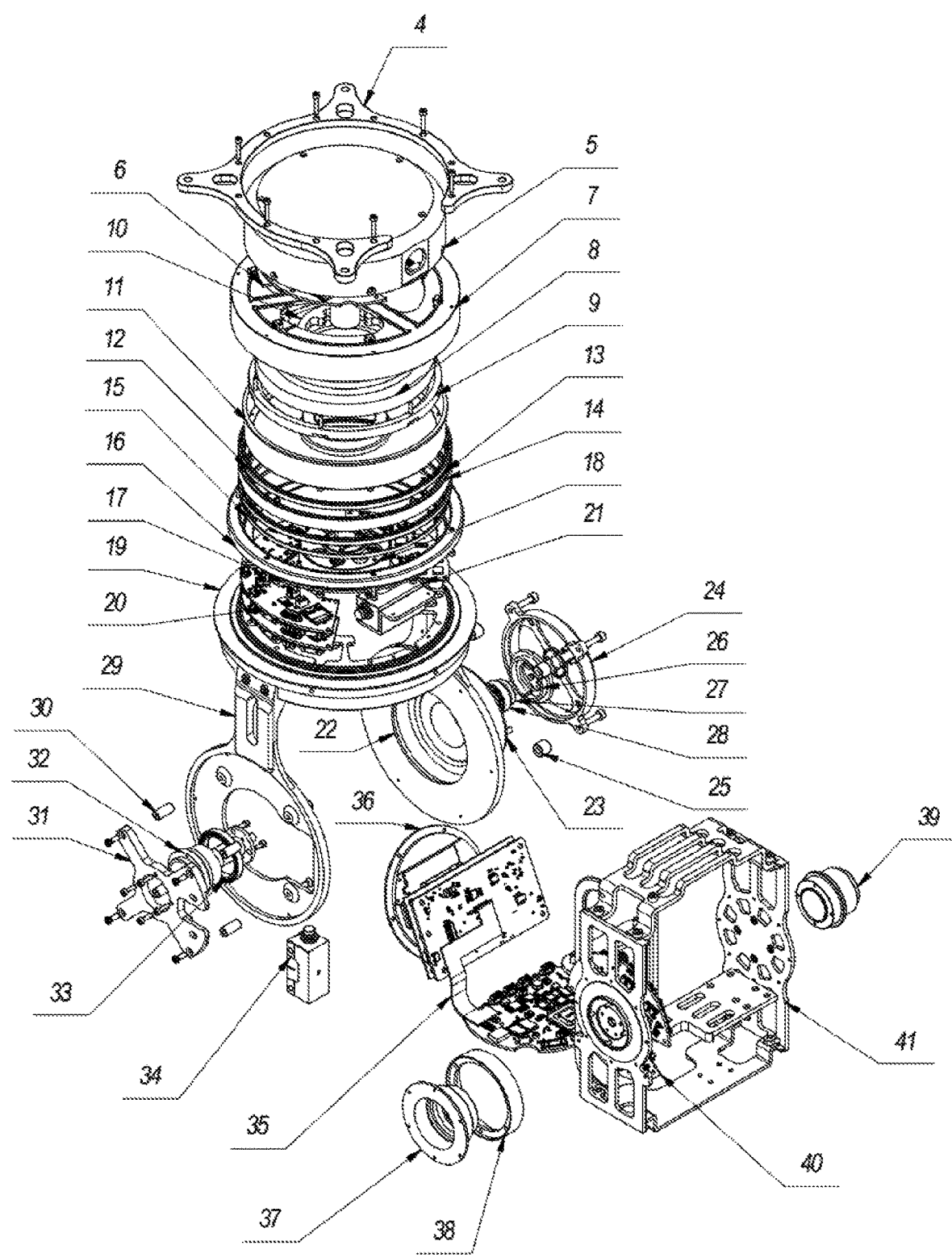
FIG. 3 Detailed of the direct drive mechanism.
Figure 4:
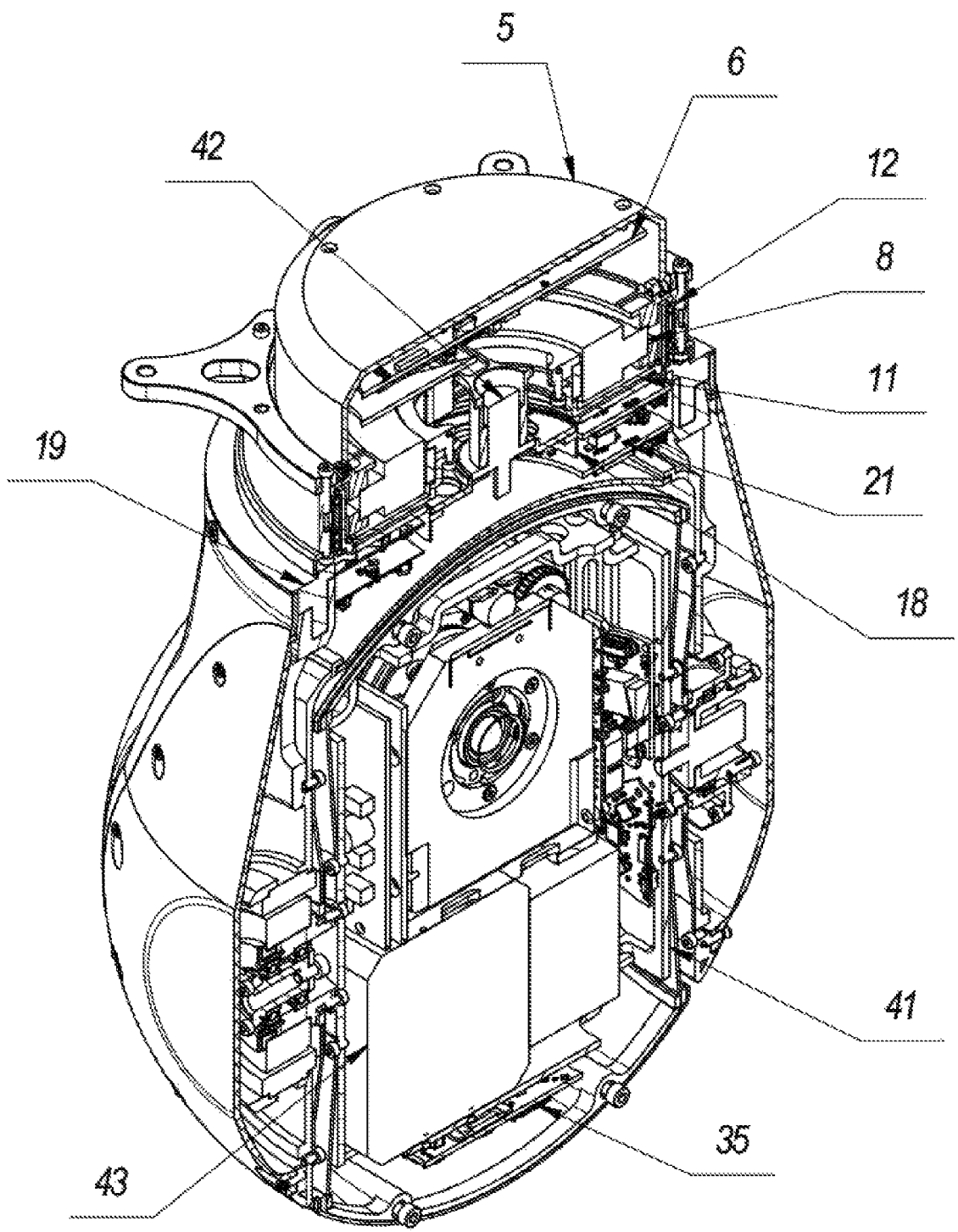
FIG. 4 Section view of the structure.

FIG. 1 shows a general description of the mechanical structure design, FIG. 2 shows a industrial design as well as the full design of structure with optical sensor assembly and protective housing being completely integrated, FIG. 3 describes and details list of structural components, FIG. 4 show the section view of the direct drive mechanism.

The main equipment assemblies of the two-axle drive mechanism are included: Assembly pedestal (1): consists of a mechanical part, central processing electronic circuit and Pan-axis drive mechanism; connecting the structure with a motorized device, coordinating the general operation of the structure and performing the Pan-axis rotation drive. Beside protecting the internal equipment from the enviroment function, the mechanical part has anti-air resistance design and is compact for easily assembly of motor vehicles and UAVs.

At each substructure, the differences are

Mounting foot (4): is a mechanical part made of aluminum alloy used to mount the mechanism to a UAV by a bolt joint.

Central processing box (5): is a mechanical part made of aluminum alloy used to protect the central controller electronic circuit and attached to Motor and slip-ring mounting bracket pan-axis (7);

Central controller electronic circuit (6): is an electronic circuit which coordinates the general operation of the structure, communicates with peripheral devices to receive control commands, receive data and issue warning and control signals to other components in the system.

Motor and slip-ring mounting bracket pan-axis (7): is a mechanical part made from aluminum alloy used to fix the motor stator and slip-ring.

Pan-axis Direct motor (8): is a direct-drive frameless motor in which the stator and rotors are clamped by Mounting stator of Pan-axis Direct motor (9) and Mounting rotor of Pan-axis Direct motor (10), which is made from aluminum alloy.

Pan-axis shaft (11): is a precision rotating mechanical part used to transmit the shaft rotation motion from Pan-axis Direct motor (8).

Thin Section Bearing (12): is super slim standard bearing but ensuring the load and durability; Beside reducing the friction of axial rotation function, this bearing optimizes the layout space and mass of the mechanism.

Moreover, according to the invention execution ideal, Thin Section Bearing (12) needs to use Inner spacing part (13), Outer spacing part (14), Inner grommet (15), Outer grommet (16). With:

Inner spacing part (13): is a rotating mechanical part used to determine the distance of the inner ring of two Thin Section Bearing (12).

Outer spacing part (14): is a rotating mechanical part used to determine the distance of the outer ring of two Thin Section Bearing (12).

Inner grommet (15): is a rotating mechanical part used to tighten the inner ring of two Thin Section Bearing (12).

Outer grommet (16): is a rotating mechanical part used to tighten the outer ring of two Thin Section Bearing (12).

Fixing inner bearing part (17): is a rotating mechanical part used to fix, protect the Thin Section Bearing mechanism.

Pan-axis Encoder (18): is a disk rotary encoder used to indicate the actual speed of the shaft rotation.

According to the invention ideal, at Assembly pedestal (1), Central controller electronic circuit (6) is better if designed in a circular shape that fits perfectly into the Central processing box (5).

Assembly Pan-axis (2) is composed of mechanical parts, Pan-axis Electronic circuit block and Tilt-axis drive mechanism connecting Assembly pedestal and Assembly Tilt-axis, performing the axial rotation and feedback the value of the acceleration sensor to Assembly pedestal. Assembly Pan-axis is protected from the impact environment when a vehicle is moving by protective housing.

According to the invention implementation, Assembly Pan-axis (2) consists of: Pan-axis turntable (19), Pan-axis Electronic circuit board (20), Pan-axis Encoder reader and Mounting (21), Pan-axis support arm (22), Tilt-axis Direct motor (23), Mounting stator of Tilt-axis Direct motor (24), Spacing foot motor (25), Mounting rotor of Tilt-axis Direct motor (26), Tilt-axis shaft (27), Tilt-axis Motor bearing (28), Encoder reader support hand (29), Spacing foot (30), Encoder reader mounting (31), Tilt-axis Mounting slip-ring shaft (32), Tilt-axis bearing (33), Tilt-axis Encoder reader (34).

At each substructure of Assembly Pan-axis (2), the differences are

Pan-axis turntable (19): is a precision mechanical part made of aluminum alloy used to cover the Pan-axis Encoder reader and Mounting (21), Pan-axis Electronic circuit board (20) and connect with Pan-axis shaft (11) by bolt joints.

Pan-axis Electronic circuit board (20): includes power circuit, Pan and Tilt motor control circuit and accelerometer sensor for power distribution, control motor speed and collect the angular velocity and angular position value.

Pan-axis Encoder reader and Mounting (21): is a device that reads the speed parameter of an infrared encoder, which is mounted on the same plane of the shaft encoder via the mounting bracket to Pan-axis turntable (19).

Pan-axis support arm (22): is a precision mechanical part made of aluminum alloy to connect and support the Pan-axis turntable (19) with Assembly Tilt-axis (3). This part has bolt joint to assemble the protective housing block.

Tilt-axis Direct motor (23) is a direct-drive frameless motor.

Mounting stator of Tilt-axis Direct motor (24) is a mechanical part made of aluminum alloy to fasten the Tilt motor stator by bolt joints and Spacing foot motor (25).

Spacing foot motor (25) is a mechanical part made of aluminum alloy to ensure Mounting stator of Tilt-axis Direct motor clamped tightly to Pan-axis support arm.

Mounting rotor of Tilt-axis Direct motor (26) is a mechanical part made of aluminum alloy to clamp the rotors of Tilt-axis Direct motor.

Tilt-axis shaft (27) is a rotating mechanical part made of aluminum alloy to position the Tilt-axis rotation.

Tilt-axis Motor bearing (28) is standard bearing to to reduce friction between the Tilt-axis shaft (27) and Tilt-axis rotation shaft (39).

Encoder reader support hand (29) is a precision mechanical part made of aluminum alloy to Pan-axis turntable (19) with Assembly Tilt-axis (3) and fix Encoder reader. This part has a bolt joint to assemble the protective housing block.

Spacing foot (30) is a mechanical part made of aluminum alloy in order to create space for attached counterweight blocks balanced Tilt transmition driver block to ensure the center of Tilt rotation block closest to the rotation Tilt-axis (minimizing the inertial force generated of Tilt rotation block).

Encoder reader mounting (31) is a mechanical part made of aluminum alloy for mounting Tilt-axis Encoder reader.

Tilt-axis Mounting slip-ring shaft (32) is a disk-shape mechanical part made of aluminum alloy to mount the Tilt-slip-ring.

Tilt-axis bearing (33) is standard bearing to to reduce friction between Tilt-axis Mounting slip-ring shaft (32) and Tilt-axis Encoder (38).

Tilt-axis Encoder reader (34) is a device that reads the speed parameter of an infrared encoder, which is mounted on the same plane of the shaft encoder via the mounting bracket to Encoder reader mounting (31).

According to the invention ideal, at Assembly Pan-axis (2), electrical circuits (20) need a design arc shape with a round edge and two levels arrangement on the Pan-axis turntable (19).

Assembly Tilt-axis (3) include mechanical parts, Tilt-axis electronic circuit blocks connecting the optical module block with the image processing electronic circuit and rotation Tilt-axis block. Assembly Tilt-axis is protected from the impact environment by the protective housing.

According to the invention ideal, Assembly Tilt-axis (3) consists of: Electronic image processing block (35), Radiator (36), Encoder shaft mounting (37), Tilt-axis Encoder (38), Tilt-axis rotation shaft (39), Tilt-axis Electronic circuit board (40), Optical sensors brackets (41).

At each substructure of Assembly Tilt-axis (3), the differences are:

Electronic image processing block (35) includes CPU (central processing unit) for image processing, electronic circuits controlling, image conversion, integrated to protective housing.

Radiator (36) is a mechanical part made of aluminum alloy bars. Parts are mounted in the shell, using wind from the outside environment to reduce the temperature for image processing circuitry.

Encoder shaft mounting (37) is a mechanical part made from aluminum alloy to mount the encoder.

Tilt-axis Encoder (38) is a disk rotary encoder used to indicate the actual speed of the shaft rotation.

Tilt-axis rotation shaft (39) is a mechanical part made from aluminum alloy to transmit motion from Tilt-axis motor to Optical sensors brackets (41).

Tilt-axis Electronic circuit board (40) includes accelerometer, electronic circuit standardizing image signals mounted on the frame, perpendicular to Tilt-axis.

Optical sensors brackets (41) includes mechanical frames made of aluminum alloy to fix the optical sensors.

According to the implementation of the invention, at Assembly Tilt-axis (3), electronic image processing block (35) is arranged around Tilt-axis protective housing with heat sink to save space for optical sensor block (43), which is integrated into Optical sensors brackets (41).

Assembly pedestal (1) and Assembly Pan-axis (2) is connected by Pan-axis shaft (11) and Pan-axis turntable (19) by bolt joints. Assembly Tilt-axis (3) is connected to Assembly Pan-axis (2) by bearing, Encoder shaft mounting (37), Tilt-axis rotation shaft (39) and Tilt-axis bearing (33).

When performing the task, the central controller electronic circuit (6) communicates, controls and sends the value of rotation angle, speed of rotation angle . . . to the control circuits of Pan/Tilt by slip-ring. At Pan/Tilt controller electronic circuits, based on angular/angular velocity feedback from the sensors to calculate and give appropriate control parameters, meet the requirements from the communication and control motor by independent drive circuit. Pan-axis Direct motor (8) drive the Assembly Pan-axis (2) through Pan-axis shaft (11) and Thin Section Bearing (12) to reduce rotation friction. Tilt-axis Direct motor (23) drive Assembly Tilt-axis (3) contain optical sensors through encoder shaft mounting (37) and Tilt-axis rotation shaft (39) using 2 Tilt-axis bearings (33) to reduce rotation friction. Two motors perform diver independently according to the control purpose of the requested task.

Using inner space of the shaft motor to arrange slip-ring (42), designing the Pan-axis shaft (11) cover outside the Pan-axis Direct motor (8), using 2 thin section bearing (12), using the mounting surface to locate the encoder (18), arranging electronic circuit and encoder reader surrounding the encoder as well as arrange symmetric Tilt-axis drive block and encoder block helps saving layout space, optimized weight, eliminating the intermediate transmission mechanism (e.g. gear system, belt).

Therefore, The dimension of Assembly pedestal (1) depends only on the diameter of the motor, the height of Assembly pedestal depends on the height of three electronic circuit floor and the height of the motor; The dimensions of Assembly Pan-axis and Assembly Tilt-axis are only dependent on the size of the integrated optical sensors.

All of shape mechanical components, shape electronic circuits are designed to fill the entire remaining space of the device. Therefore, the mechanism optimizes the space inside the protective shell.

In addition, the mechanical parts made of aluminum alloy are added hardened ribs and anodized to make sure the structure is hardened, optimize the weight, as well as isolate the electronic circuit blocks. The types of aluminum alloys that can be used are 6061-T6, 2017. That alloys have similar physical and thermal properties, choosing production suitable materials of mechanical parts depends on the aluminum workpiece available on the market.

The invention claimed is:

1. The two-axis direct drive mechanical mechanism includes: an Assembly pedestal,
   an Assembly Pan-axis, and Assembly Tilt-axis,
   the Assembly pedestal includes:
   a Central processing electronic circuit that is protected by a central processing box that is mounted in a motor and slip-ring mounting bracket pan-axis to locate a motor stator and slip-ring,
   a Pan-axis Direct motor which is a direct-drive frameless motor, for which a stator and rotor are located by a Mounting stator of the Pan-axis Direct motor and a Mounting rotor of the Pan-axis Direct motor,
   a Pan-axis shaft is a precision rotating mechanical part used to transmit shaft rotation motion from the Pan-axis Direct motor,
   a Thin Section Bearing comprising a super slim standard bearing fixes the distance of an inner spacing part and an outer spacing part;
   the Assembly Pan-axis includes:
   a Pan-axis turntable which has disk-shape used to cover a Pan-axis Encoder reader and Mounting, a Pan-axis Electronic circuit board and connect with the Pan-axis shaft by bolt joints, connect with an Assembly Tilt-axis by a Pan-axis support arm,
   the Pan-axis Electronic circuit board includes a power circuit, a Pan and Tilt motor control circuit and an accelerometer sensor for power distribution, control motor speed and collecting an angular velocity and an angular position value,
   a Pan-axis Encoder reader and Mounting comprising a device that reads a speed parameter of an infrared encoder, which is mounted on a same plane of a shaft encoder via the mounting bracket to Pan-axis turntable,
   a Tilt-axis Direct motor comprising a direct-drive frameless motor in which the stator and rotors are clamped by a Mounting stator of the Pan-axis Direct motor and the Mounting rotor of Pan-axis Direct motor through a spacing foot,
   a Tilt-axis shaft has a disk shape used to locate the tilt-axis, include tilt-axis bearing to reduce friction between tilt-axis and assembly tilt-axis;
   the Assembly Tilt-axis includes:
   an Electronic image processing block including CPU (central processing unit) for image processing, electronic circuits controlling, image conversion, integrated to protective housing,
   a Radiator comprising a mechanical part made of aluminum alloy bars, parts are mounted in the shell, using wind from the outside environment to reduce the temperature for image processing circuit,
   a Tilt-axis rotation shaft is a mechanical part made from aluminum alloy to transmit motion from a tilt-axis motor to optical sensors brackets, which include mechanical frames made of aluminum alloy to fix the optical sensors;
   a Tilt-axis Electronic circuit board including accelerometer, electronic circuit standardizing image signals mounted on the frame, perpendicular to the Tilt-axis,
   a Tilt-axis Encoder comprising a disk rotary encoder used to indicate the actual speed of the shaft rotation, which is located by an encoder shaft mounting.

2. The Two-axis direct drive mechanical mechanism according to claim 1 wherein the mechanism is mounted to an UAV by a mounting foot at an assembly pedestal with a bolt joint.

3. The Two-axis direct drive mechanical mechanism according to claim 1 comprising an assembly pedestal of two-axis direct drive mechanical mechanism, wherein the Central processing electronic circuit is designed in a circular form that fits perfectly into a Central processing box.

4. The Two-axis direct drive mechanical mechanism according to claim 1 wherein the electrical circuits comprise a design arc shape with a round outer edge and two levels arrangement on the pan-axis turntable.

5. The Two-axis direct drive mechanical mechanism according to claim 1 wherein the assembly tilt-axis of two-axis direct drive mechanical mechanism, comprises an electronic image processing block arranged around a Tilt-axis protective housing with a heat sink to save space for an optical sensor block, which is integrated into Optical sensors brackets.

6. The Two-axis direct drive mechanical mechanism according to claim 1 wherein the mechanical parts of the two-axis direct drive mechanical mechanism are made of aluminum alloy.

7. The Two-axis direct drive mechanical mechanism according to claim 1 wherein the Assembly pedestal and assembly pan-axis are connected together by a Pan-axis shaft Pan-axis turntable with bolt joints, the assembly tilt-axis is connected to the assembly pan-axis by a join bearing with encoder shaft mounting and tilt-axis rotation shaft.

* * * * *